(12) United States Patent
Whittle et al.

(10) Patent No.: US 11,149,561 B2
(45) Date of Patent: Oct. 19, 2021

(54) SYSTEM AND METHOD FOR MAKING CERAMIC MATRIX COMPOSITE VANE WITH PROFILED END WALLS

(71) Applicant: Rolls-Royce plc, London (GB)

(72) Inventors: Michael J. Whittle, London (GB); Andrew T. Holt, London (GB); Guillaume Lambertin, London (GB)

(73) Assignee: Rolls-Royce plc

( * ) Notice: Subject to any disclaimer, the term of this patent is extended or adjusted under 35 U.S.C. 154(b) by 137 days.

(21) Appl. No.: 16/538,251

(22) Filed: Aug. 12, 2019

(65) Prior Publication Data

US 2021/0047934 A1 Feb. 18, 2021

(51) Int. Cl.
*F01D 5/28* (2006.01)

(52) U.S. Cl.
CPC ............. *F01D 5/284* (2013.01); *F01D 5/282* (2013.01); *F05D 2220/32* (2013.01); *F05D 2300/6033* (2013.01)

(58) Field of Classification Search
CPC . F01D 5/284; F01D 5/282; F01D 9/02; F01D 25/005; F01D 5/145; F01D 25/285; F05D 2220/32; F05D 2300/6033; F05D 2230/00; F05D 2240/12; F05D 2240/80; C04B 35/622; C04B 35/80
See application file for complete search history.

(56) References Cited

U.S. PATENT DOCUMENTS

| | | | |
|---|---|---|---|
| 8,356,975 B2 | 1/2013 | Grover et al. | |
| 8,884,182 B2 | 11/2014 | Lee et al. | |
| 8,980,435 B2 | 3/2015 | De Diego | |
| 9,050,769 B2 | 6/2015 | Monaghan et al. | |
| 9,308,708 B2 | 4/2016 | Kleinow | |
| 10,018,054 B2 | 7/2018 | Verrilli et al. | |
| 2005/0156361 A1 | 7/2005 | Holowczak et al. | |
| 2008/0135530 A1 | 6/2008 | Lee et al. | |
| 2014/0271153 A1* | 9/2014 | Uskert | F01D 9/065 415/177 |
| 2015/0003997 A1 | 1/2015 | Mironets et al. | |
| 2015/0016972 A1 | 1/2015 | Freeman et al. | |
| 2020/0088050 A1 | 3/2020 | Whittle et al. | |

FOREIGN PATENT DOCUMENTS

| | | | |
|---|---|---|---|
| EP | 3050863 | 8/2016 | |
| EP | 3050863 A1 * | 8/2016 | ........... C04B 35/573 |

OTHER PUBLICATIONS

European Search Report for application No. 20186649.8-1004, dated Nov. 12, 2020, 8 pages.

* cited by examiner

*Primary Examiner* — Jacob M Amick
*Assistant Examiner* — Charles J Brauch
(74) *Attorney, Agent, or Firm* — Barnes & Thornburg LLP

(57) ABSTRACT

Systems and methods of forming a ceramic matrix composite vane with profiled endwalls are provided using a multi-piece tooling. The multi-piece tooling includes core tools as well as profiled endwall tools having three dimensional contours formed in the tools that correspond to the three dimensional shape to be formed on the vane endwalls.

16 Claims, 7 Drawing Sheets

SYSTEM AND METHOD FOR MAKING CERAMIC MATRIX COMPOSITE VANE WITH PROFILED END WALLS

FIELD OF THE DISCLOSURE

The present disclosure relates generally to gas turbine engines, and more specifically to manufacturing profiled endwalls in ceramic matrix composite ("CMC") components in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

To withstand heat from the combustion products received from the combustor, the turbine may include turbine wheels having blades that comprise composite materials adapted to interact with the hot combustion products. In turbine endwalls, the pressure gradient between the pressure surface of one airfoil and the suction surface of an adjacent airfoil results in overturning of low momentum fluid in the endwall boundary layer, which increases secondary loss. Profiled endwalls may use local surface curvature to change local static pressure field. This results in reducing overturning of flow and secondary loss and significant engine fuel burn benefit. However, manufacturing of profiled endwalls in CMC components can present design challenges.

SUMMARY

The present disclosure may comprise one or more of the following features and combinations thereof.

A method of forming a ceramic matrix composite vane with profiled endwalls in accordance with the present disclosure includes a number of steps. The method may comprise providing a vane preform having an inner endwall preform, an outer endwall preform spaced apart radially from the inner endwall preform relative to an axis, and an airfoil preform that extends radially between and interconnects the inner endwall preform and the outer endwall preform, and providing a multi-piece tool that includes an inner endwall tool, an outer endwall tool, and a core tool. The inner endwall tool may be formed to define a first recessed profile that extends radially outward into the inner endwall tool. The outer endwall tool may be formed to define a second recessed profile that extends radially inward into the outer endwall tool.

The inner endwall tool may be located adjacent the inner endwall preform and the outer endwall tool adjacent the outer endwall preform. The core tool may be inserted radially between the inner endwall tool and the outer endwall tool such that the core tool is adjacent the airfoil preform and holds the inner endwall tool and the outer endwall tool in position radially relative to the vane preform. The vane preform tool may be infiltrated with ceramic materials to provide a ceramic matrix composite vane, the ceramic matrix composite vane including a ceramic matrix composite inner endwall having a first contour corresponding with the first recessed profile, a ceramic matrix composite outer endwall having a contour corresponding with the second recessed profile, and a ceramic matrix composite airfoil that extends between and interconnects the ceramic matrix composite inner endwall and the ceramic matrix composite outer endwall.

In some embodiments, the method may further comprise moving the core tool away from the ceramic matrix composite vane, the inner endwall tool, and the outer endwall tool after the infiltrating step. The method may include separating the inner endwall tool from the ceramic matrix composite inner endwall after the step of moving the core tool and separating the outer endwall tool from the ceramic matrix composite outer endwall after the step of moving the core tool.

In some embodiments, the method may further comprise blocking the inner endwall tool from moving relative to the ceramic matrix composite vane with the first contour of the ceramic matrix composite inner endwall before the step of moving the core tool away from the ceramic matrix composite vane.

In some embodiments, the method may further comprise blocking the outer endwall tool from moving relative to the ceramic matrix composite vane with the second contour of the ceramic matrix composite outer endwall before the step of moving the core tool away from the ceramic matrix composite vane.

In some embodiments, separating the inner endwall tool from the ceramic matrix composite inner endwall may include moving the inner endwall tool radially outward relative to the ceramic matrix composite vane. In some embodiments, separating the outer endwall tool from the ceramic matrix composite outer endwall may include moving the outer endwall tool radially inward relative to the ceramic matrix composite vane.

In some embodiments, the method may comprise blocking the inner endwall tool from moving axially and circumferentially relative to the ceramic matrix composite vane with the first contour of the ceramic matrix composite inner endwall. In some embodiments, the step of inserting the core tool may include translating the core tool relative to the inner endwall tool and the outer endwall tool.

In some embodiments, the inner endwall preform may include a body connected with the airfoil and a thickened portion supported by the body and spaced apart from the airfoil preform. The thickened portion may extend into the first recessed profile of the inner endwall tool when the inner endwall tool is located adjacent the inner endwall preform.

According to an aspect of the present disclosure, a method of manufacturing profiled endwalls on ceramic matrix composite (CMC) airfoils may comprise a number of steps. The method may include providing an airfoil preform including a radially inner endwall, a radially outer endwall spaced apart radially from the radially inner endwall relative to an axis, and an airfoil body that extends radially between the radially inner endwall and the radially outer endwall, providing tool means for forming a three-dimensional contour in a surface of the endwall, and forming a CMC airfoil having a profiled endwall including the three-dimensional contour in a surface of the endwall.

In some embodiments, the tool means may comprise at least a core tool for forming a blade sidewall of the airfoil, and radially inner and outer profiled endwall tools. At least one of the radially inner or radially outer profiled endwall tools may include a surface geometry for forming the three-dimensional contour in the surface of the endwall.

In some embodiments, the tool means comprises a multi-piece tool including suction side radially inner and outer profiled endwall tools, a suction side core tool, pressure side radially inner and outer profiled endwall tools, and a pressure side core tool. Forming the CMC airfoil may further comprise assembling the multi-piece tool around the preform so that each respective suction side tool contacts and aligns with the respective pressure side tool.

In some embodiments, the method may further comprise removing the multi-piece tool from the formed CMC airfoil having a profiled endwall. The suction side and pressure side core tools may be removed prior to removal of the suction side and pressure side endwall tools.

In some embodiments, the tool means may comprise a cast including one or more recesses to form one or more protrusions on the radially inner or outer endwall of the CMC airfoil. In some embodiments, the forming step may include locating the preform in the cast so that the one or more recesses form a negative space between an endwall surface of the preform and the cast surface, and impregnating the porous preform with a slurry to fill the negative space and form projections on the endwall.

In some embodiments, a slurry is deposited on a surface of the endwall. The cast may be stamped into the slurry so that the profiled endwall includes one or more protrusions.

According to the present disclosure, a method of manufacturing profiled endwalls in ceramic matrix composite (CMC) airfoils may comprise a number of steps. The method may include providing an airfoil preform including a radially inner endwall and a radially outer endwall, locating tooling at endwall surfaces of the radially inner and outer endwalls, the tooling including geometric voids corresponding to a three-dimensional surface contour to be formed on the endwall surfaces, and providing a material to the endwall surfaces to fill the geometric voids and form the three-dimensional surface contour profile on the endwalls In some embodiments, the tooling may comprise radially inner and outer profiled endwall tools and a core tool to be positioned between the radially inner and outer profiled endwall tools. In some embodiments, the tooling may comprise a cast and the profiled endwall includes protrusions. The protrusions may be formed by one of infiltration or stamping.

In some embodiments, the core tool may be configured to extend along a pressure or suction side of a vane wall. The radially inner and outer profiled endwall tools may further comprise suction side and pressure side radially inner and outer profile endwall tools. The core tool may comprise suction side and pressure side core tools. Each of the suction side and corresponding pressure side tools may be complementary in shape in order to surround the preform.

These and other features of the present disclosure will become more apparent from the following description of the illustrative embodiments.

DETAILED DESCRIPTION OF THE DRAWINGS

Figure 1:
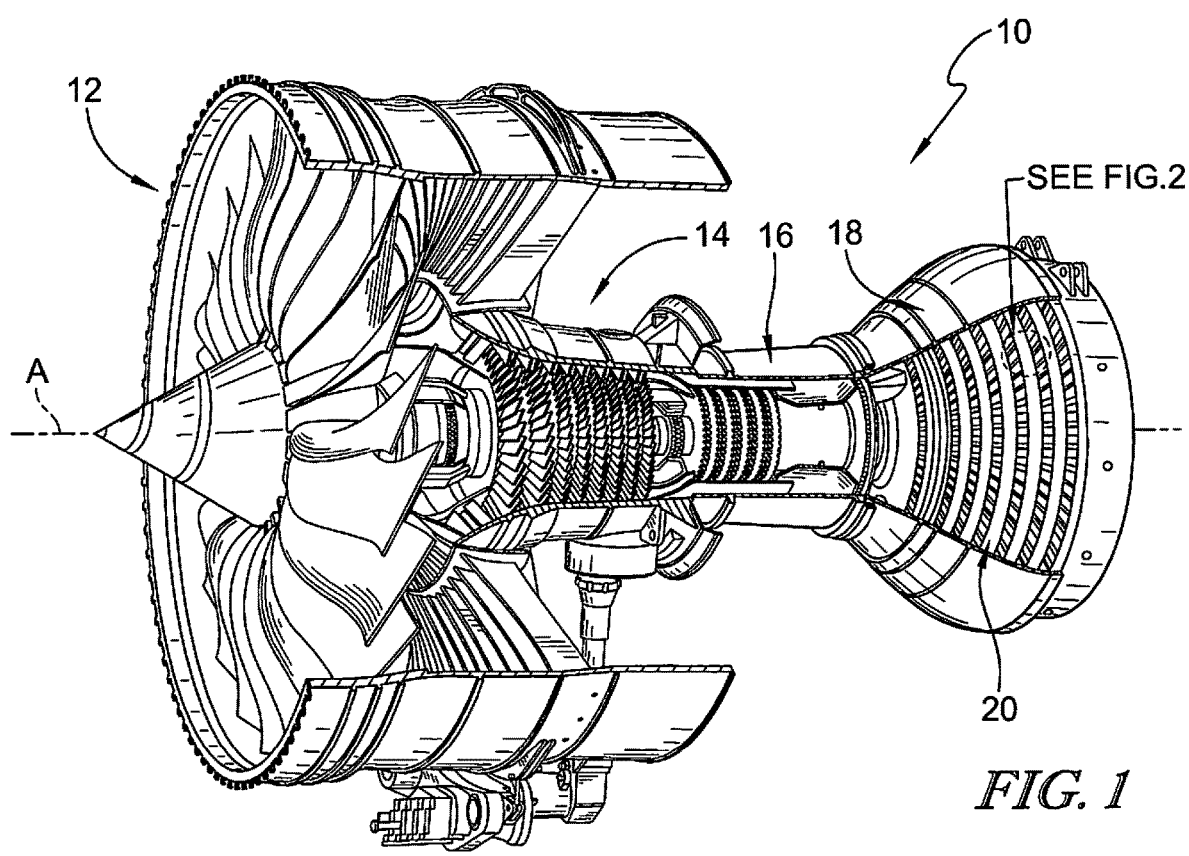
FIG. 1 is a partial cutaway view of a gas turbine engine that includes a fan, a compressor, a combustor, and a turbine that includes a plurality of turbine wheel assemblies in accordance with the present disclosure that are adapted to extract work from hot combustion products received from the combustor.

For the purposes of promoting an understanding of the principles of the disclosure, reference will now be made to a number of illustrative embodiments illustrated in the drawings and specific language will be used to describe the same.

Figure 2:
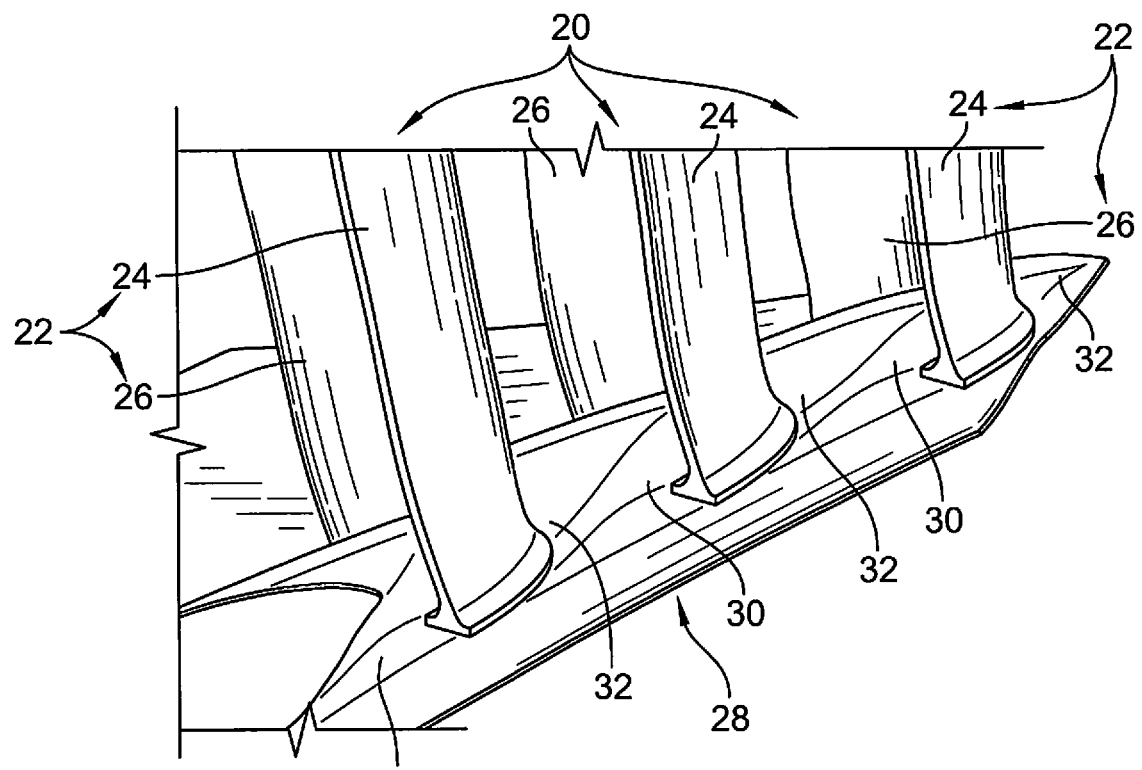
FIG. 2 is a perspective cutaway view of a portion of one of the turbine wheel assemblies included in the gas turbine engine of FIG. 1 showing that the turbine wheel assembly includes a plurality of composite blades and that a radially inner endwall of each of the blades has three-dimensional sloped contouring along its surface to provide a profiled endwall.

Airfoils 20 for use in a gas turbine engine are shown in FIG. 2. The gas turbine engine 10 includes a fan 12, a compressor 14, a combustor 16 housing a plurality of nozzle guide vanes ("NGVs"), and a turbine 18 housing a plurality of stationary and rotating blades as shown in FIG. 1.

Airfoils 20, as illustrated in the cutaway section of FIG. 2, may include any of the NGVs, stationary, and rotating blades in the gas turbine engine 10. For illustrative purposes, airfoils 20 are shown to each include a sidewall 22, having pressure 24 and suction 26 surfaces, and a radially inner endwall 28 having contoured pressure 30 and suction 32 surfaces (sometimes called profiled endwalls). Contoured pressure and suction surfaces 30, 32 of endwall 28 are depicted as non-axisymmetric endwalls with complex three-dimensional sloped surfaces in x, r, and theta coordinates. Airfoils 20 may be formed of composite materials, such as ceramic matrix composites. Although not depicted, airfoils 20 may include radially outer endwalls having non-axisymmetric endwalls with complex three-dimensional sloped surfaces in x, r, and theta coordinates, which may be the same or different form the radially inner endwall surface geometry.

Figure 3:
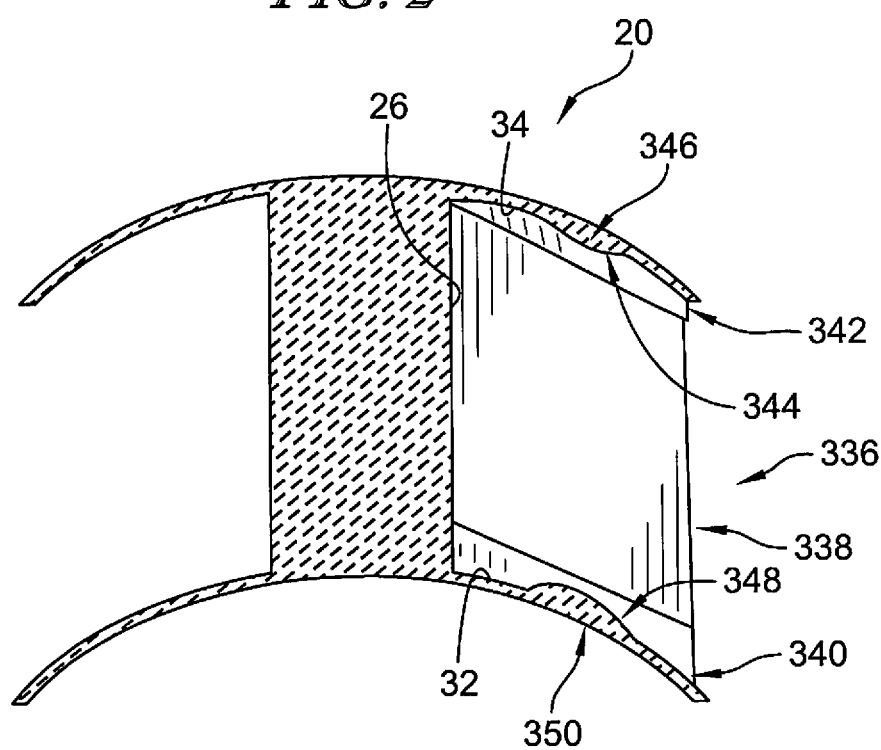
FIG. 3 is a diagrammatic view of components of a multi-piece tooling that forms the three-dimensional contoured surface on radially inner and radially outer endwalls of the composite blade, the multi-piece tool including a core tool, a radially inner endwall profiled endwall tool, and a radially outer profiled endwall tool.

A schematic cross-sectional view of an airfoil 20 in accordance with the present disclosure is shown in FIG. 3. Airfoil 20 is shown with multi-piece tooling 336 assembled on sidewall suction surface 26, radially inner endwall suction surface 32, and radially outer endwall suction surface 34.

The multi-piece tooling 336 includes a suction side core tool 338, a suction side radially inner profiled endwall tool 340 and a suction side radially outer profiled endwall tool 342. As illustrated in FIG. 3, a composite has already been applied via the multi-piece tooling 336 and the final airfoil 20 has a geometry has a complementary shape to the multi-piece tooling 336.

Radially outer endwall suction surface 34 includes a recessed profile defining a three dimensional contour 344 that corresponds to a surface geometry 346 of the suction side radially outer profiled endwall tool 342. Likewise, radially inner endwall suction surface 32 includes a recessed profile having a three dimensional contour 348 that corresponds to a surface geometry 350 of the suction side radially inner profiled endwall tool 340. Multi-piece tooling 336 permits suction side core tool 338 to be removed from the final composite airfoil 20, and subsequent removal of radially inner and outer profiled endwall tools 340, 342 from the formed three dimensional contours 344, 348.

Figure 4A:
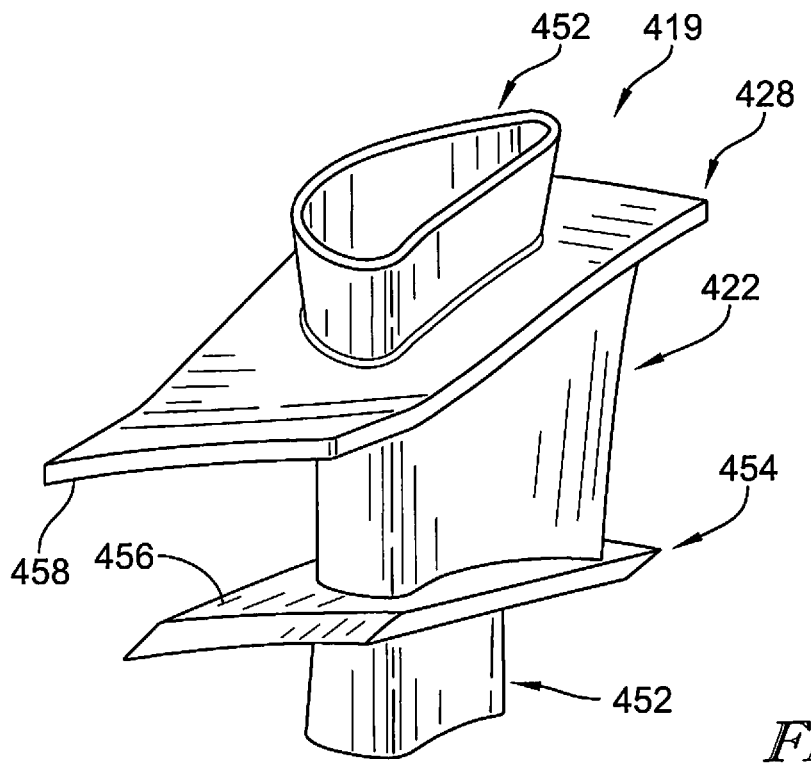
FIG. 4A is a perspective view of an airfoil CMC preform used to manufacture the turbine wheel assembly of FIG. 2, the airfoil CMC preform having preform radially inner and outer endwalls, a preform blade sidewall, and preform distal ends.
Figure 8A:
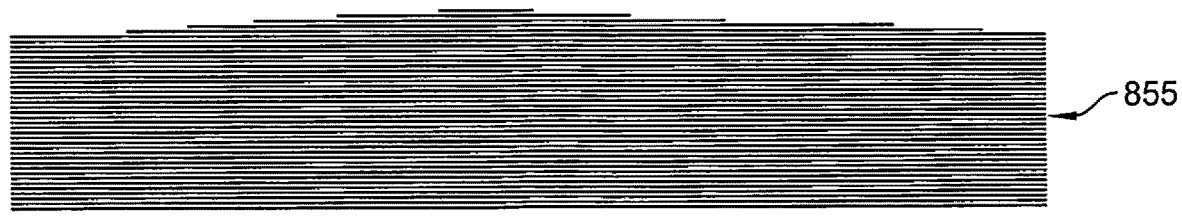
FIG. 8A-8C illustrate three different cross-sectional views of configurations of inner endwalls formed contoured by layered plies including layered plies of different dimensions, a deformed plurality of layered plies, and a plurality of plies with a slurry formation formed on the radially inner surface.

FIGS. 4A-4E illustrate how the multi-piece tooling 436 is assembled with a CMC preform 419 to form the airfoils of FIGS. 1-3. The multi-piece tooling 436 may be formed from graphite or alternative materials, such as molybdenum and is depicted transparently for ease of reference. As shown in FIG. 4A, the CMC preform 419 includes radially outer and inner preform endwalls 428, 454, a preform sidewall 422 extending between the preform endwalls 428 454, and distal preform tip ends 452 extending exterior to the preform endwalls 428, 454. Preform endwalls 428, 454 have non-contoured inner surfaces 456, 458. In other embodiments, the inner surface 456, 458 may have stacks of ceramic fiber plys layered on the surfaces 456, 458 to form contoured protrusions that will be infiltrated to form rigid protrusions, such as the stacked formation of ceramic plies 855 sized and shaped progressively smaller to form the contours for an inner surface 856 shown in FIG. 8A.

Figure 4B:
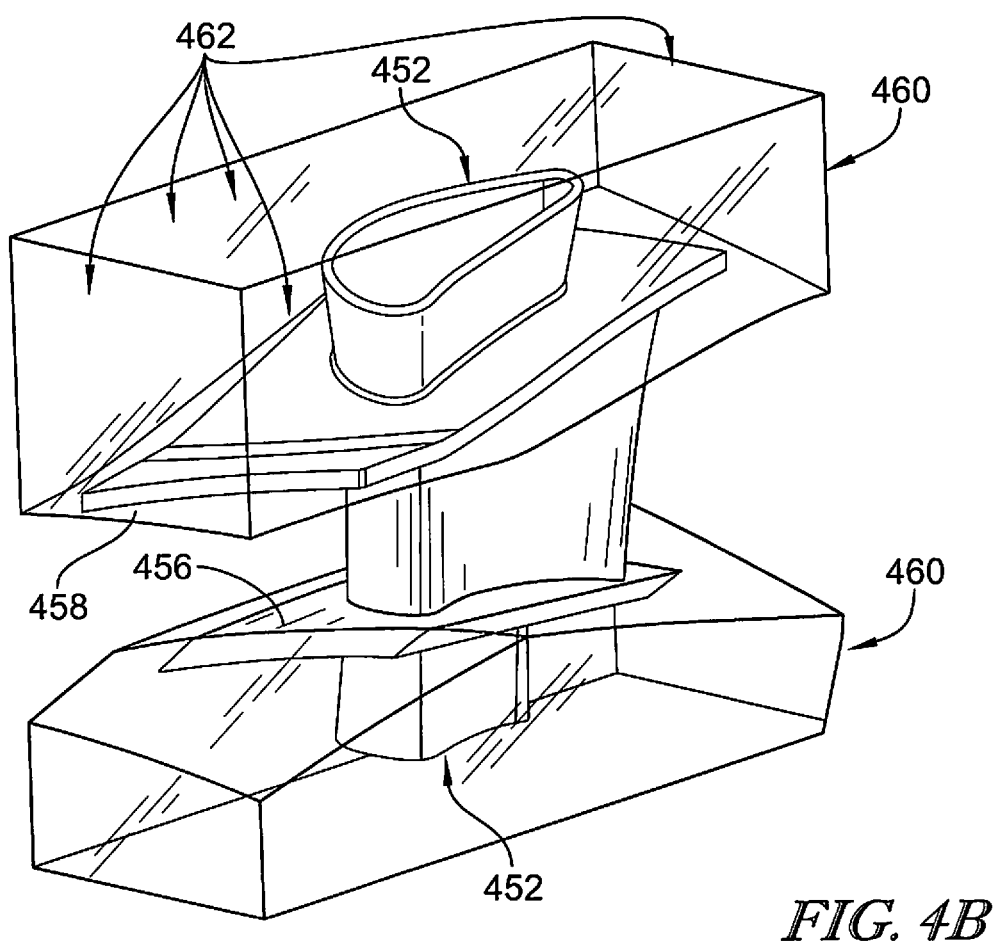
FIG. 4B is a perspective view of the CMC preform of FIG. 4A in which distal end tools, shown as being transparent for ease of reference, have been coupled to the preform to secure the preform and leave exposed surfaces of the radially inner and outer endwalls and the blade sidewall.

The distal end tools 460 may be coupled to the distal preform tip ends 452, with the distal preform tip ends 452 fitting into recesses in the distal end tools 460 as shown in FIG. 4B. The inner surfaces 456, 458 remain exposed and are not covered by the distal end tools 460. The distal end tools 460 provide flat exterior working surfaces 462 to secure, clamp, set down, and otherwise handle the CMC preform 419. The suction side multi-piece tooling 464 may be assembled and fitted between the distal end tools 460.

Figure 4C:
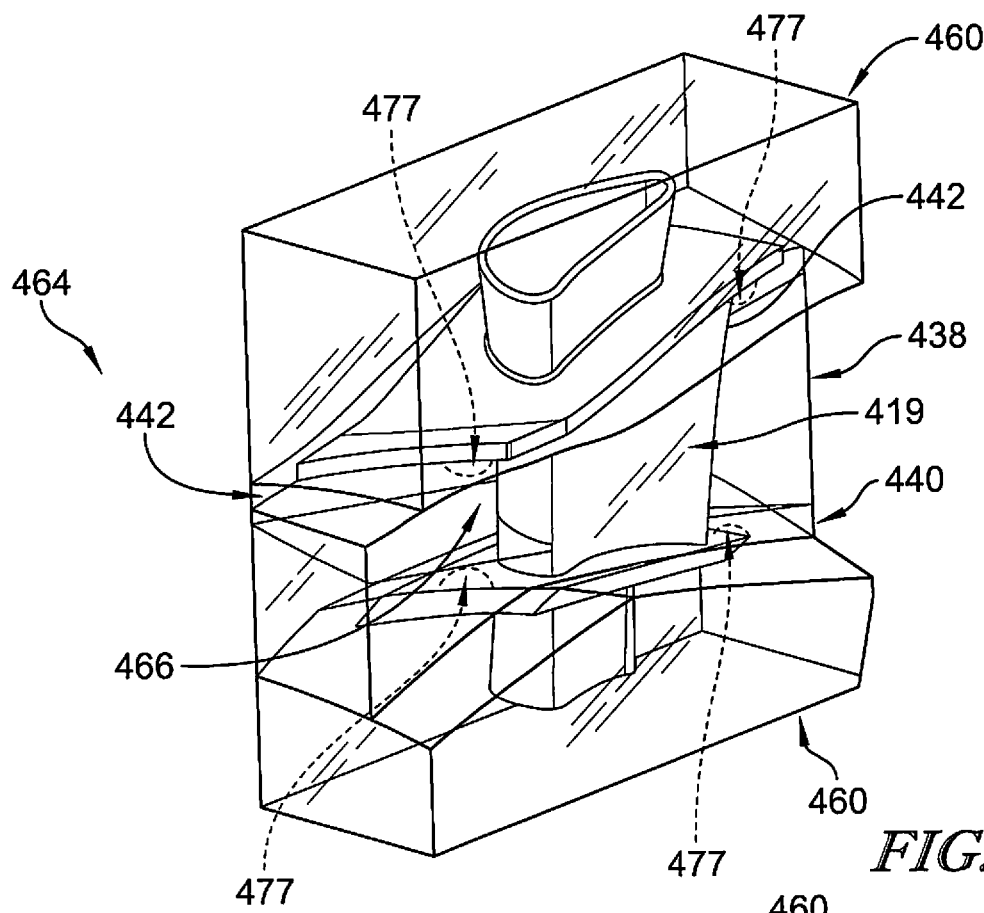
FIG. 4C is a perspective view of the CMC preform of FIG. 4B in which suction side tooling, shown as being transparent for ease of reference, of the multi-piece tooling is applied to a suction side of the CMC preform.

The suction side multi-piece tooling 464 includes a suction side core tool 438, a suction side radially inner profiled endwall tool 440, and a suction side radially outer profiled endwall tool 442 as depicted in FIG. 4C. Each of the suction side core tool 438, suction side radially inner profiled endwall tool 440, and radially outer profiled endwall tool 442 may be positioned between the distal end tools 460 in any sequential order of assembly. Each of the suction side core tool 438, suction side radially inner profiled endwall tool 440, and radially outer profiled endwall tool 442 include a concavity 466 corresponding to the convex shape of the sidewall 22 of the CMC preform 419.

The suction side core tool 438 is aligned with and adjacent to a larger area of the preform sidewall 422 relative to the radially inner and outer suction side profiled endwall tools 440, 442. The suction side core tool 438 is relatively thicker and larger than the radially inner and outer suction side profiled endwall tools 440, 442. Illustratively, the suction side radially inner and radially outer profiled endwall tools 440, 442 include three dimensional geometries 477 that define recesses on surfaces that face the inner surfaces 456, 458. The inner and radially outer profiled endwall tools 440, 442 contact with the inner surfaces 456, 458 and cause the inner surfaces 456, 458 to conform with and take on the three dimensional shape of the suction side radially inner and radially outer profiled endwall tools 440, 442.

In some embodiments, the suction side radially inner and radially outer profiled endwall tools 440, 442 include three dimensional geometries 477 on surfaces that face the inner surfaces 456, 458, to form voids between the inner surfaces 456, 458 and the suction side radially inner and radially outer profiled endwall tools 440, 442 so that a three dimensional surface geometry may be formed on the inner surfaces 456, 458. In other embodiments, fiber plys on the inner surfaces 456, 458 are located in the voids so that the three dimensional surface geometry may be formed on the inner surfaces 456, 458 via the fiber plys. The three dimensional surface geometries 477 may be the same or different in the suction side radially inner and radially outer profiled endwall tools 440, 442.

Figure 4D:
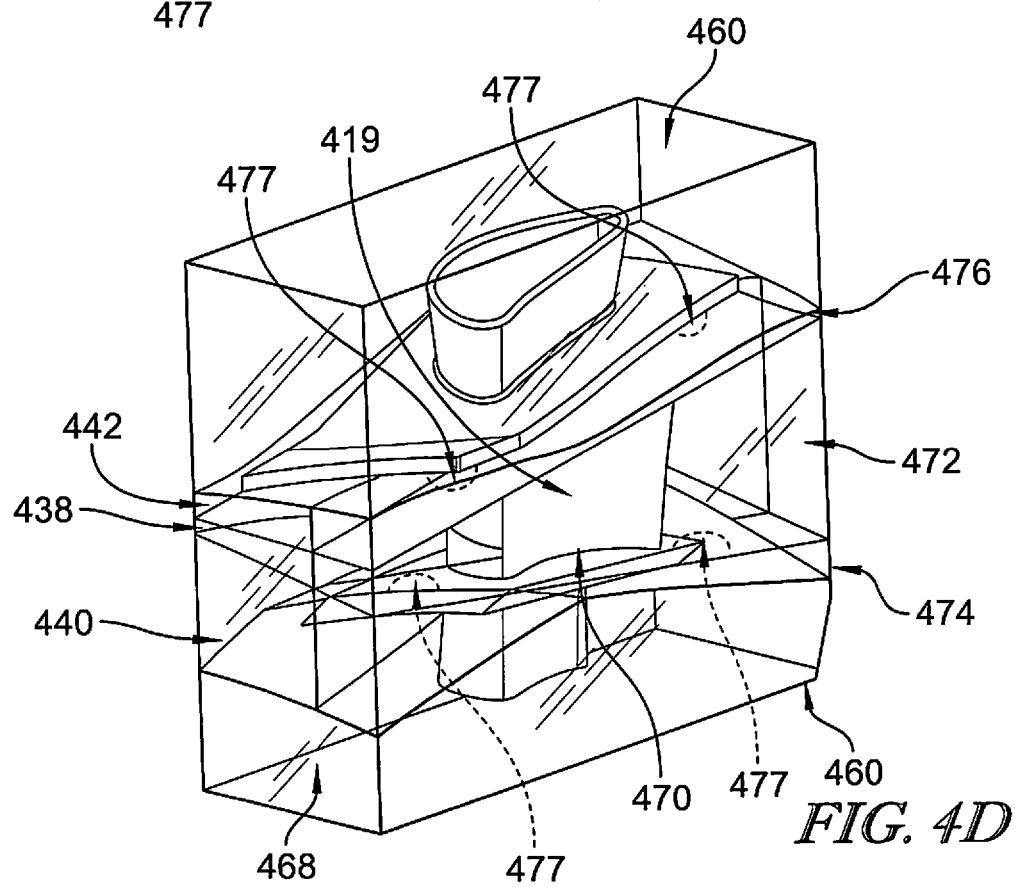
FIG. 4D is a perspective view of the CMC preform of FIG. 4C in which pressure side tooling, shown as being transparent for ease of reference, of the multi-piece tooling is applied to a pressure side of the CMC preform.

The pressure side multi-piece tooling 468 includes pressure side core tool 472, a pressure side radially inner profiled endwall tool 474 and a pressure side radially outer profiled endwall tool 476 as depicted in FIG. 4D. Each of the pressure side core tool 472, pressure side radially inner profiled endwall tool 474, and radially outer profiled endwall tool 476 may be positioned between the distal end tools 460 in any sequential order of assembly. Each of the pressure side core tool 472, pressure side radially inner profiled endwall tool 474, and radially outer profiled endwall tool 476 include a convexity 470 corresponding to the concave shape of the sidewall 22 of the CMC preform 419.

The pressure side core tool 472 is aligned with and adjacent to a larger area of the preform sidewall 422 relative to the radially inner and outer pressure side profiled endwall tools 474, 476. The pressure side core tool 472 is relatively thicker and larger than the radially inner and outer pressure side profiled endwall tools 474, 476.

Illustratively, the pressure side radially inner and outer pressure side profiled endwall tools 474, 476 include three dimensional geometries 477 that define recesses on surfaces that face the inner surfaces 456, 458. The inner and radially outer profiled endwall tools 474, 476 contact with the inner surfaces 456, 458 and cause the inner surfaces 456, 458 conform with and take on the three dimensional shape of the pressure side radially inner and radially outer profiled endwall tools 474, 476.

Figure 8B:
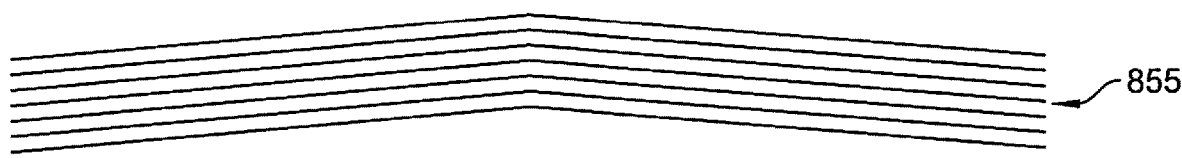

In some embodiments, the pressure side radially inner and radially outer profiled endwall tools 474, 476 may include three dimensional geometries 477 on surfaces that face the non-contoured inner surfaces 456, 458, to form voids between the non-contoured inner surfaces 456, 458 and the pressure side radially inner and radially outer profiled endwall tools 474, 476 so that a three dimensional surface geometry may be formed on the non-contoured inner surfaces 456, 458. In other embodiments, fiber plys on the inner surfaces 456, 458 are located in the voids so that the three dimensional surface geometry may be formed on the inner surfaces 456, 458 via the fiber plys. In some embodiments, inner surfaces 456, 458 may be deformed to fill the voids by a corresponding male tool of complementary shape of the radially inner profiled endwall tools 474, 476 positioned radially exterior to the endwall preforms deforming a stack of ceramic plies 855 as shown in FIG. 8B.

The three dimensional surface geometries 477 may be the same or different in the suction side radially inner and radially outer profiled endwall tools 440, 442. The three dimensional surface geometries 477 may be the same or different in the pressure side radially inner and radially outer profiled endwall tools 474, 476 and may be the same or different than the three dimensional geometries 477 in the suction side radially inner and radially outer profiled endwall tools 440, 442.

Figure 4E:
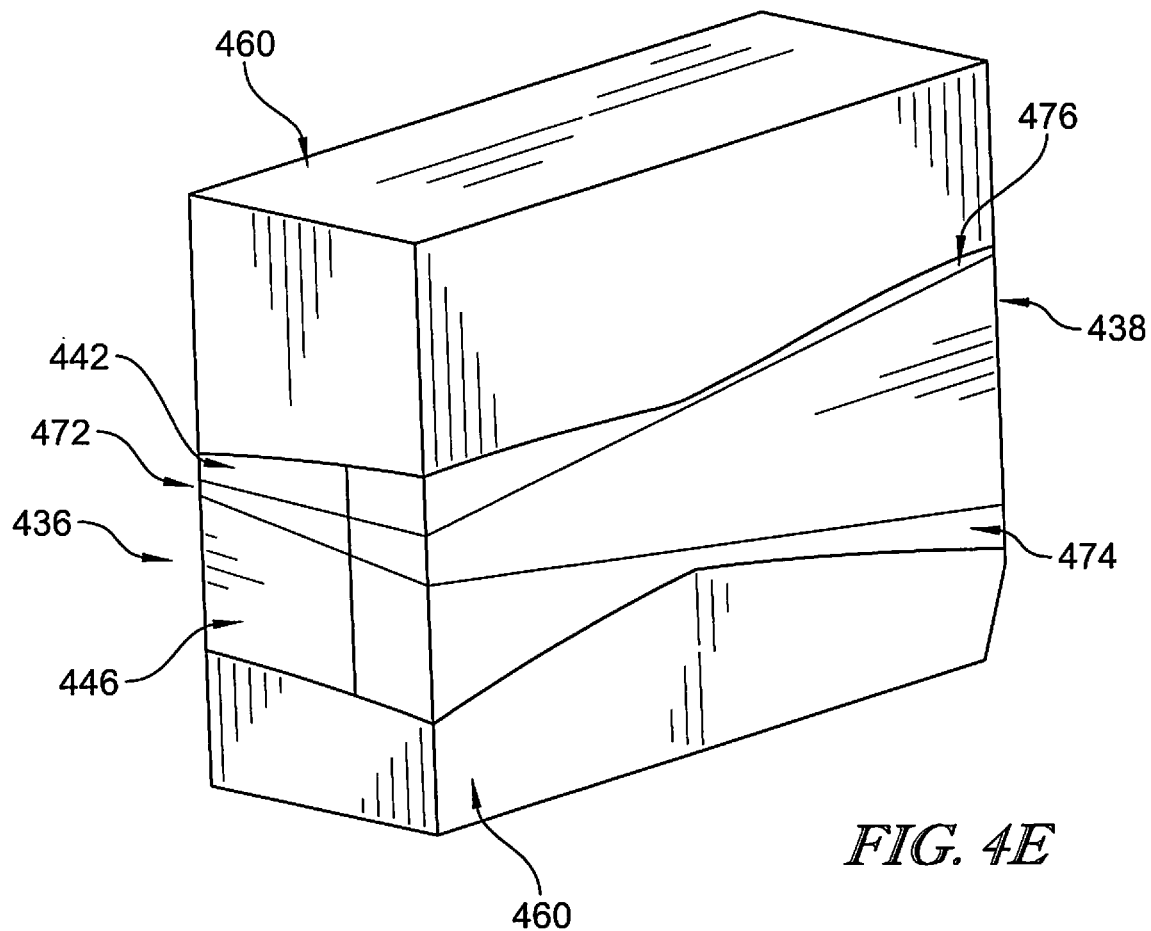
FIG. 4E is an exterior view of the fully assembled multi-piece tooling encasing the CMC preform of FIG. 4A, depicting the distal end tools and suction and pressure side tools of the multi-piece tooling.

As illustrated in FIG. 4E, the multi-piece tooling 436 has complementary shapes to completely surround and cover the CMC preform 419 and fit between the distal end tools 460. The pressure and suction side core tools 438, 472 may be inserted last in order to hold the assembled multi-piece tooling 436 in fitted position. Alternatively, tooling may be installed in a vertically stacking bottom-up sequence from the radially inner to radially outer endwall. The resulting assembled multi-piece tooling 436 with distal end tools 460 forms a rectangular box shape. However, the tools may be formed to fit together in other shapes as well.

Multiple infiltration holes (not shown) may be formed in the multi-piece tooling to introduce CMC or other composite materials in order to form the surfaces of the final CMC airfoil, as depicted for example in FIG. 3 with contoured radially inner and outer endwalls. The CMC may be liquefied and may be introduced, for example, by chemical vapor infiltration (CVI) or other methods. The pressure side and suction side core tools 438, 472 must be removed first as the newly formed radially inner and outer endwall will have contours that fill the previously-existing voids, thereby blocking their removal. Therefore, pressure and suction side core tools 438, 472 must be removed first in a radial direction to allow for clearance of the newly formed radially inner and outer endwall contours by vertical, or movement in a radial direction, of suction side radially inner and radially outer profiled endwall tools 440, 442 and of pressure side radially inner and outer profiled endwall tools 474, 476 when removing the multi-piece tooling 436. Although the multi-piece tooling 436 is illustrated in FIG. 4A-4E has having both radially inner and radially outer profiled endwall tools 440, 442, 474, 476, the multi-piece tooling may be designed to have only one, two, three or all four profiled endwall tools to profile one or more portions of the radially inner or radially outer endwall. In these embodiments, the endwall tools that are not profiled may form a unitary singular tool structure with the corresponding core tool. For example, the multi-piece tool may comprise a core and endwall tool as a unitary structure with a non profiled radially outer endwall and a separate radially inner profiled endwall tool, or vice versa, on one or both of the pressure or suction sides.

Figure 5:
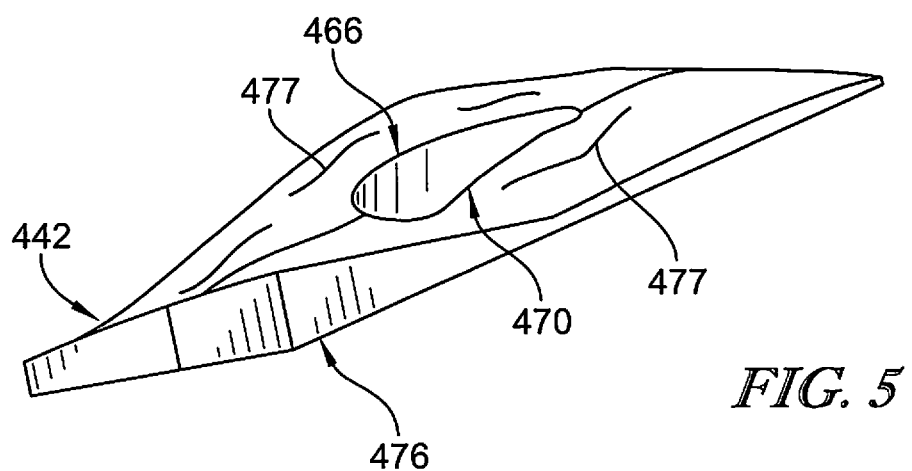
FIG. 5 illustrates exemplary radially outer suction side and pressure side profiled endwall tools.

As seen in FIG. 5, the radially outer suction side profiled endwall tool 442 and the radially outer pressure side profiled endwall tool 476 each include concave three dimensional geometries 477 to form contours on the radially outer endwall surface. Respective convex 470 and concave 466 surfaces form an opening to accommodate the blade sidewall 22 therethrough. Otherwise, radially outer suction side profiled endwall tool 440 and radially outer pressure side profiled endwall tool 476 contact each other fully at their abutting surfaces. Radially inner suction side and pressure side profiled endwall tools are similarly formed with three dimensional geometries, convex and concave surfaces, and fully contacting abutting surfaces.

Figure 6:
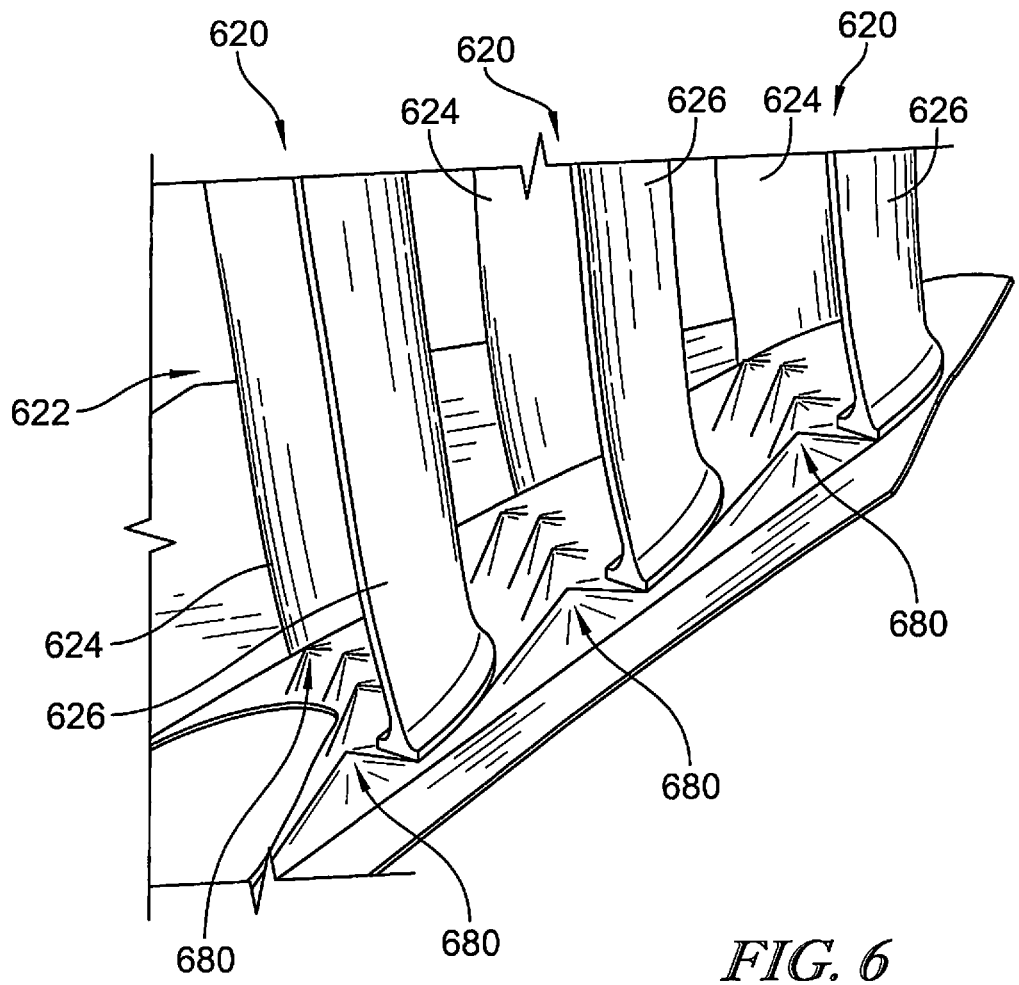
FIG. 6 is a perspective cutaway view of a portion of one of the turbine wheel assemblies included in the gas turbine engine of FIG. 1 showing that the turbine wheel assembly includes a plurality of composite blades, and a radially inner endwall of each of the blades has three-dimensional protrusions along its surface.

According to another embodiment in FIG. 6, airfoils 620 may be formed with protrusions 680 formed on the endwall surfaces. The airfoils 620 each include a sidewall 622, having pressure 624 and suction 626 surfaces and a radially inner endwall 628 having contoured pressure 630 and suction 632 surfaces. Contoured pressure and suction surfaces 630, 632 of endwall 628 are depicted as non-axisymmetric endwalls with three-dimensional protrusions 680 extending out from the endwall surfaces. The airfoils 620 may be formed of composite materials, such as ceramic matrix composites. Although not depicted, the airfoils 620 may include radially outer endwalls having non-axisymmetric endwalls with three-dimensional protrusions, which may be the same or different form the radially inner endwall surface geometry. These protrusions may be pyramidal as depicted, cylindrical, cubical, or any other geometry sharply defined edges.

Figure 7:
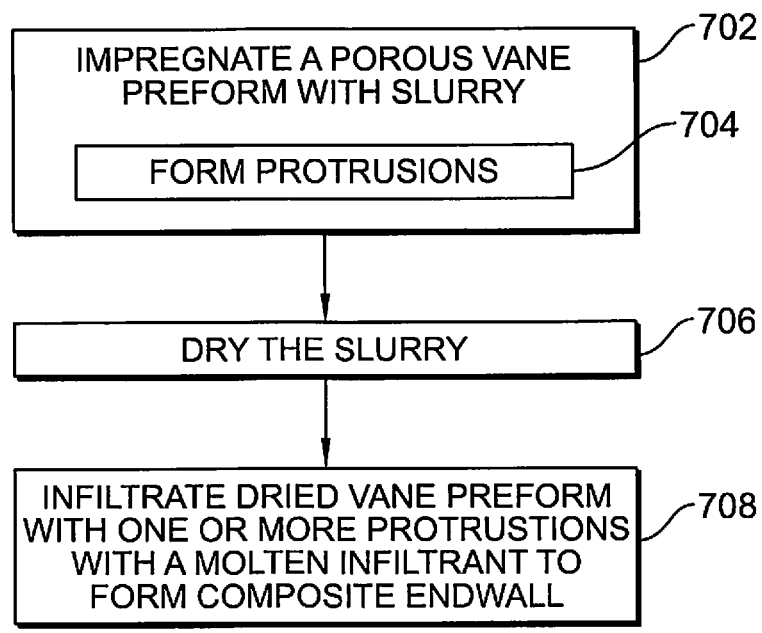
FIG. 7 is a diagram of a method of forming the airfoil blades of FIG. 6 having three-dimensional protrusions on the endwalls.
Figure 8C:
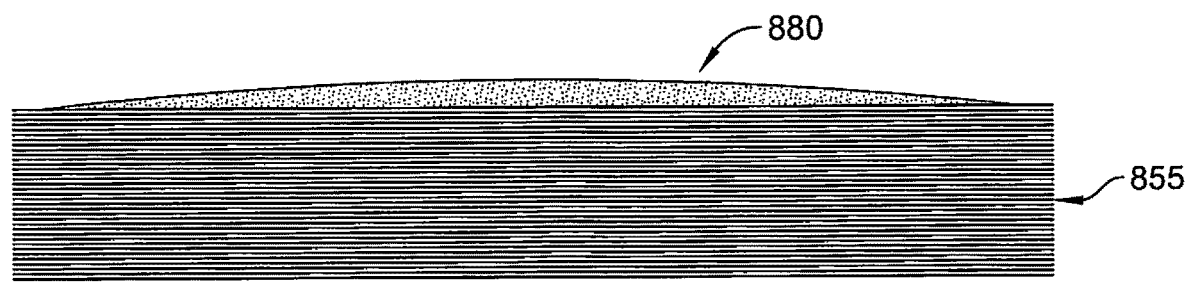

A method of forming endwall surfaces with protrusions is shown in FIG. 7 may be performed by impregnating a porous vane preform with slurry 702, protrusions may be formed in the endwalls 704, by a stamping a cast into a slurry deposited on the endwall or a molding the slurry between the endwall and a cast, drying the slurry 706, and infiltrating the dried vane preform including the one or more protrusions with a molten infiltrant to form the composite endwall of the airfoil 708. An exemplary view of a slurry-formed inner endwall contour 880 formed on a surface of a stack of ceramic plies 855 is illustrated in FIG. 8C. Further details of stamping and casting processes may be found in U.S. Patent Application Publication No. 2016/0214907, titled FORMING A SURFACE LAYER OF A CERAMIC MATRIX COMPOSITE ARTICLE and published on 28 Jul. 2016, which publication is expressly incorporated by reference.

The disclosed embodiments minimize the number of tool pieces in the multi-piece tooling so that the size of each individual tool may be maximized. Maximized size may prolong each tools life and limit breakages. By making the tools of the multi-piece tooling from graphite or molybdenum, the tools may not distort or lose dimensional conformance like some metallic tools do over time.

The present disclosure offers the ability to manufacture profiled endwalls in CMC components. Profiled end walls may limit the vorticity generated along high turning, high Mach number airfoils, which may be a source of significant efficiency deficit. As such, the present disclosure may provide for a significant engine fuel burn benefit.

Generally, profiled endwalls (PEWs) of the present disclosure include the application of streamline curvature to endwalls in a turbine. This results in non-axisymmetric endwalls which are complex 3D surfaces in x,r and theta. The pressure gradient between the pressure surface of one aerofoil and the suction surface of the adjacent aerofoil over turbine endwalls may result in an overturning of low momentum fluid in the endwall boundary layer. This overturning of flow may increase the secondary loss. Profiled endwalls of the present disclose may use the local surface curvature of the endwalls to change the local static pressure field. This may reduce the overturning of flow and secondary loss.

The multi-piece tooling of the present disclosure enables formation of these profiled features in CMC parts. By applying profiled tooling with limited thickness at the endwall region, a central tool could still be withdrawn. The size of the endwall tool may be dictated by the strength of the tool material (i.e. if graphite then a relatively thick tool may be used for durability). Alternative materials such as molybdenum could be used. Illustrations of the embodiments shown in the drawings are not show with CVI gas infiltration holes or tool restraints for clarity purposes.

FIGS. 4A-4E illustrate an embodiment of the profiled endwall tool. The tool split lines are indicative and would be located as per one or more of the following considerations: minimizing the number of tool pieces used by locating in such a way that the size of each individual tool can be maximized (while accepting that the tool cannot encompass the entire aerofoil); maximizing the size of each individual tool to prolong tool life and reduce breakages (CMC CVI tools may be made from graphite which may be prone to breaking. CMC pre-form tools may be metallic and breaking is less of a concern but distortion and dimensional conformance is); maximizing the number of CVI gas infiltration holes and penetration to the CMC surfaces; ease of assembling the tools around the CMC pre-form; and ease of locating/restraining tools relative to each other for CMC part dimensional conformance.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A method of forming a ceramic matrix composite vane with profiled endwalls, the method comprising:
   providing a vane preform having an inner endwall preform, an outer endwall preform spaced apart radially from the inner endwall preform relative to an axis, and an airfoil preform that extends radially between and interconnects the inner endwall preform and the outer endwall preform,
   providing a multi-piece tool that includes an endwall tool, and a core tool, the endwall tool formed to define a first recessed profile that extends radially into the endwall tool,
   locating the endwall tool adjacent one of the inner endwall preform and the outer endwall preform,
   inserting the core tool radially between the inner endwall preform and the outer endwall preform such that the core tool is adjacent the airfoil preform and holds the endwall tool in position radially relative to the vane preform, and infiltrating the vane preform with ceramic materials to provide the ceramic matrix composite vane, the ceramic matrix composite vane including a ceramic matrix composite inner endwall or outer endwall having a first contour corresponding with the first recessed profile, and a ceramic matrix composite airfoil that extends between and interconnects the ceramic matrix composite inner endwall and the ceramic matrix composite outer endwall.

2. The method of claim 1, wherein endwall tool comprises an inner endwall tool and the inner endwall has the first contour, and the multi-piece tool further comprises an outer endwall tool, and the vane preform further comprises an outer endwall having a contour corresponding with a second recessed profile, the method further comprising moving the core tool away from the ceramic matrix composite vane, the inner endwall tool, and the outer endwall tool after the infiltrating step, separating the inner endwall tool from the ceramic matrix composite inner endwall after the step of moving the core tool, and separating the outer endwall tool from the ceramic matrix composite outer endwall after the step of moving the core tool.

3. The method of claim 2, further comprising blocking the inner endwall tool from moving relative to the ceramic matrix composite vane with the first contour of the ceramic matrix composite inner endwall before the step of moving the core tool away from the ceramic matrix composite vane.

4. The method of claim 2, further comprising blocking the outer endwall tool from moving relative to the ceramic matrix composite vane with the second contour of the ceramic matrix composite outer endwall before the step of moving the core tool away from the ceramic matrix composite vane.

5. The method of claim 2, wherein separating the inner endwall tool from the ceramic matrix composite inner endwall includes moving the inner endwall tool radially outward relative to the ceramic matrix composite vane.

6. The method of claim 2, wherein separating the outer endwall tool from the ceramic matrix composite outer endwall includes moving the outer endwall tool radially inward relative to the ceramic matrix composite vane.

7. The method of claim 1, further comprising blocking the endwall tool from moving axially and circumferentially relative to the ceramic matrix composite vane with the first contour of the ceramic matrix composite inner endwall.

8. The method of claim 1, wherein the step of inserting the core tool includes translating the core tool relative to the endwall tool.

9. The method of claim 1, wherein the inner endwall preform includes a body connected with the airfoil and a thickened portion supported by the body and spaced apart from the airfoil preform and the thickened portion extends into the first recessed profile of the endwall tool when the endwall tool is located adjacent the inner endwall preform.

10. A method of manufacturing profiled endwalls on ceramic matrix composite (CMC) airfoils, the method comprising:
    providing an airfoil preform including a radially inner endwall, a radially outer endwall spaced apart radially from the radially inner endwall relative to an axis, and an airfoil body that extends radially between the radially inner endwall and the radially outer endwall,
    providing tool means for forming a three-dimensional contour in a surface of the endwall, and
    forming a CMC airfoil having a profiled endwall including the three-dimensional contour in a surface of the endwall,
    wherein the tool means includes a multi-piece tool comprising at least one core tool for forming a blade sidewall of the airfoil, and radially inner and outer profiled endwall tools, wherein at least one of the radially inner or radially outer profiled endwall tools includes a surface geometry for forming the three-dimensional contour in the surface of the endwall.

11. The method of claim 10, wherein the radially inner and outer profiled endwall tools include suction side radially inner and outer profiled endwall tools and pressure side radially inner and outer profiled endwall tools, wherein the at least one core tool includes a suction side core tool and a pressure side core tool, and wherein forming the CMC airfoil further comprises assembling the multi-piece tool around the preform so that each respective suction side tool contacts and aligns with the respective pressure side tool.

12. The method of claim 11, further comprising removing the multi-piece tool from the formed CMC airfoil having a profiled endwall, wherein suction side and pressure side core tools are removed prior to removal of the suction side and pressure side endwall tools.

13. A method of manufacturing profiled endwalls in ceramic matrix composite (CMC) airfoils comprising:

providing an airfoil preform including a radially inner endwall and a radially outer endwall, locating tooling at endwall surfaces of the radially inner and radially outer endwalls, the tooling including geometric voids corresponding to a three-dimensional surface contour to be formed on the endwall surfaces, and providing a material to the endwall surfaces to fill the geometric voids and form the three-dimensional surface contour profile on the endwalls.

14. The method of claim 13, wherein the tooling comprises radially inner and outer profiled endwall tools and a core tool to be positioned between the radially inner and outer profiled endwall tools.

15. The method of claim 14, wherein the core tool is configured to extend along a pressure or suction side of a vane wall, and wherein the radially inner and outer profiled endwall tools further comprise suction side and pressure side radially inner and outer profile endwall tools and the core tool comprises suction side and pressure side core tools, wherein each of the suction side and corresponding pressure side tools are complementary in shape in order to surround the preform.

16. The method of claim 13, wherein the tooling comprises a cast and the profiled endwall includes protrusions, and wherein the protrusions are formed by one of infiltration or stamping.

* * * * *